United States Patent [19]
Pongracz et al.

[11] Patent Number: 6,055,546
[45] Date of Patent: Apr. 25, 2000

[54] METHOD AND APPARATUS FOR PRESERVING NON-CURRENT INFORMATION THAT CAN BE OVERWRITTEN IN A COMPUTER FILE

[75] Inventors: Gregory Pongracz, Redwood City, Calif.; Tuomas Pystynen, Helsinki, Finland

[73] Assignee: Oracle Corporation, Redwood Shores, Calif.

[21] Appl. No.: 09/343,932

[22] Filed: Jun. 30, 1999

Related U.S. Application Data

[63] Continuation of application No. 08/961,747, Oct. 31, 1997, Pat. No. 5,946,700, which is a continuation-in-part of application No. 08/962,539, Oct. 31, 1997, Pat. No. 5,991,772.

[51] Int. Cl.[7] .................................................. G06F 17/30
[52] U.S. Cl. ..................... 707/202; 200/201; 200/203; 200/204; 200/205
[58] Field of Search ..................................... 707/200, 201, 707/202, 203, 204, 205, 1; 709/248, 247, 246, 245; 714/6

[56] References Cited

U.S. PATENT DOCUMENTS

| | | | |
|---|---|---|---|
| 5,218,695 | 6/1993 | Noveck | 707/1 |
| 5,488,718 | 1/1996 | Tanaka | 707/1 |
| 5,850,507 | 12/1998 | Ngai | 395/182.14 |
| 5,926,821 | 7/1999 | Hirose | 707/202 |
| 5,991,772 | 11/1999 | Doherty | 707/202 |
| 5,996,088 | 11/1999 | Frank | 395/182.04 |

*Primary Examiner*—Thomas G. Black
*Assistant Examiner*—Diane D. Mizrahi
*Attorney, Agent, or Firm*—Law Offices of Charles E. Gotlieb

[57] ABSTRACT

A method and system periodically copies information from a computer file to a database to preserve non-current information from the file. As information from the file is overwritten by new information, the old information is preserved in the database, allowing non-current information to be used without reprogramming the computer programs or portions of the computer program that read or write the file. If the file is arranged into one or more sections, and new information stored in a section of the file is assigned an identifier higher than the other information in the section, the amount of time required to locate new information in the file can be reduced. Comparing the highest identifier in the section with the highest identifier in the database for that section can identify sections of the file that have received no new information since the last update made to the database.

17 Claims, 7 Drawing Sheets

TABLESPACE SECTION 201    209

| RECORD ID | TABLESPACE NUMBER | TABLESPACE NAME | ATTRIBUTES | |
|---|---|---|---|---|
| 212 | 214 | 216 | 218 | ←210 |

DATAFILES SECTION 202

| RECORD ID | CREATION TIME | CREATION SCN | FILENAME | TABLESPACE NUMBER | |
|---|---|---|---|---|---|
| 221  222 | 224 | 226 | 228 | 229 | ←220 |

MARK

ONLINE REDO LOG SECTION 203

| RECORD ID | CREATION TIME | CREATION SCN | FILENAME | |
|---|---|---|---|---|
| 232 | 234 | 236 | 238 | ←230 |

ARCHIVED LOGS SECTION 204

| RECORD ID | CREATION TIME | CREATION SCN | FILENAME | |
|---|---|---|---|---|
| 242 | 244 | 246 | 248 | ←240 |
| 252 | 254 | 256 | 258 | ←250 |

BACKUP SET LOG SECTION 205

| RECORD ID | CREATION TIME | CREATION SCN | FILENAME | |
|---|---|---|---|---|
| 262 | 264 | 266 | 268 | ←260 |
| 272 | 274 | 276 | 278 | ←270 |

METHOD AND APPARATUS FOR PRESERVING NON-CURRENT INFORMATION THAT CAN BE OVERWRITTEN IN A COMPUTER FILE

RELATED APPLICATIONS

This application is a continuation of application Ser. No. 08/961,747 now U.S. Pat. No. 5,946,700 entitled, "METHOD AND APPARATUS FOR PRESERVING NON-CURRENT INFORMATION THAT CAN BE OVERWRITTEN IN A COMPUTER FILE" filed Oct. 31, 1997 by Gregory Pongracz and Tuomas Pystynen and is a continuation in part of application Ser. No. 08/962,539 now U.S. Pat. No. 5,991,772 entitled, "METHOD AND APPARATUS FOR RESTORING A PORTION OF A DATABASE" filed on Oct. 31, 1997 by C. Gregory Doherty, Gregory Pongracz, William Bridge, Juan Loaiza and Mark Ramacher, application pending Ser. No. 08/962,087 entitled, "METHOD AND APPARATUS FOR IDENTIFYING FILES USED TO RESTORE A FILE" filed on Oct. 31, 1997 by Gregory Pongracz, Steven Wertheimer and William Bridge, application Ser. No. 08/962,086 now U.S. Pat. No. 6,003,044 entitled, "METHOD AND APPARATUS FOR EFFICIENTLY BACKING UP FILES USING MULTIPLE COMPUTER SYSTEMS" filed on Oct. 31, 1997 by Gregory Pongracz, Steven Wertheimer and William Bridge, and pending application Ser. No. 08/961,741 entitled, "METHOD AND APPARATUS FOR ACCESSING A FILE THAT CAN BE CONCURRENTLY WRITTEN" filed on Oct. 31, 1997 by Tuomas Pystynen and Gregory Pongracz, each having the same assignee as this application and each incorporated herein by reference in its entirety.

FIELD OF THE INVENTION

The present invention is related to the storage of information in a computer system and more specifically to the maintenance of non-current information which may be overwritten in a computer file.

BACKGROUND OF THE INVENTION

Conventional computer systems store information into files. The files can contain information used or produced by application programs, such as application data, other information or both.

When information in a file is updated, some conventional computer programs will replace the old information in the file with the new information, deleting from the file the old information. Even if the update only involves deleting the old information without replacing the old information with any new information, the old information is deleted from the file.

Other programs may mark the old information as deleted without actually deleting it from the storage device on which the file is stored, preserving the deleted information but marking the space it occupies as available for use. The old information is preserved until the space it occupies is used to store different information. Some conventional operating systems use this approach, preserving entire files which have been "deleted" by marking as available in a file allocation table the space used by the file.

Other programs make a limited attempt to preserve the most recent of the old information, even after new information is written. A conventional circular buffer may be employed for this purpose, storing new information in a portion of the file only in the space occupied by the oldest information in that portion of the file.

Still other programs preserve all of the old information in a file by writing new information in an unused area of the file. The information so stored is referred to as temporal if an indication of the effective period of the information is maintained.

Some applications make use of several of these approaches in the same file. For example, the Oracle8 product commercially available from Oracle Corporation of Redwood Shores, Calif. maintains a control file with different sections. The control file describes the arrangement of a database and the files used to store information about the database. A tablespace section contains the names and other information about the tablespaces in the database, with each tablespace containing one or more tables in the database. A datafiles section contains information such as the names of the files storing each tablespace, and describing the tablespace the file contains. A current redo log section stores the filename of the most current redo log, describing how to redo any transactions that are undone by the database program. An archived logs section stores filenames of a certain number of the most recent formerly current redo logs. A backup set logs section stores the filenames of a certain number of the most recent files describing information about backups made from the database.

Only the most current information is stored in the tablespace section. If a tablespace is dropped from the database, the name and other information about the tablespace is deleted from the control file. If information about the tablespace changes, the new information is written over the old information in the file.

The datafiles section contains current information about datafiles used in the database, but information about datafiles no longer used by the database program are marked for deletion and not actually deleted until information about a new datafile replaces the information that was marked for deletion.

The online redo log section is always current, with the name and other information about a new online redo log replacing information about an old online redo log. However, the information about the old online redo log is stored in the archived logs section of the control file using a circular buffer arrangement. The information formerly stored in the online redo log section is copied over the oldest set of information in the archived logs section, preserving information about a certain number of the most recent online redo logs.

The backup set log section is a circular buffer, with new backup set information overwriting the oldest information in that section of the file.

Some computer programs or portions of computer programs can be more accurate if current as well as non-current information is available to the program or portion of the program. For example, to restore some or all of the files of a database to a particular point in time, it is helpful to have the names of the tablespaces and the names of the files used to store such tablespaces and other files of the database as of the desired point in time. However, the control file described above does not provide all of the non-current information for the database. To restore the database to a point in time before the control file was extensively modified may be difficult or impossible only using the control file.

If the computer program or portion of the computer program that writes the file does not do so in a manner that preserves all of the non-current information desired by the other computer program or portion, either the program or portion that can use the non-current information may not be as efficient, or the program or portion that writes the file must be reprogrammed. Sometimes, such reprogramming is not possible, for example, if the vendor of the computer program that can use the non-current information is different from the vendor that provides the computer program that writes the file. Even if such reprogramming is possible, the expense of reprogramming the program that writes the file, and potentially reprogramming any other computer programs or portions that read the file using the current structure may be prohibitive.

A system and method are therefore needed to preserve non-current information overwritten in a computer file without reprogramming the computer program or portion of the computer program that writes the file.

SUMMARY OF INVENTION

A method and system maintains non-current information from a file in a database. The information in the file is periodically checked against the database to determine whether the file contains information different from the information in the database. If the file contains information different from information in the database, the information from the file is copied into a new row of the database. If the file is arranged into one or more sections, and each group of information added to a section is assigned a number that is higher than all the prior groups of information in the section, the assigned number of the last row added to the database from that section may be used to determine if any groups of information have been added to a section. If no new groups of information have been added to a section, the groups of information in that section need not be checked against the database to determine if any changes have been made as long as the groups of information in that section are not able to be modified.

As the information in the file is overwritten with more current information, not only is the current information added to the database, the non-current information is preserved in the database, preserving the non-current information without reprogramming the computer programs or portions of the computer programs that access the file.

BRIEF DESCRIPTION OF THE DRAWINGS

FIG. 2 is a block diagram illustrating a file according to one embodiment of the present invention.

DETAILED DESCRIPTION OF A PREFERRED EMBODIMENT

Figure 1:
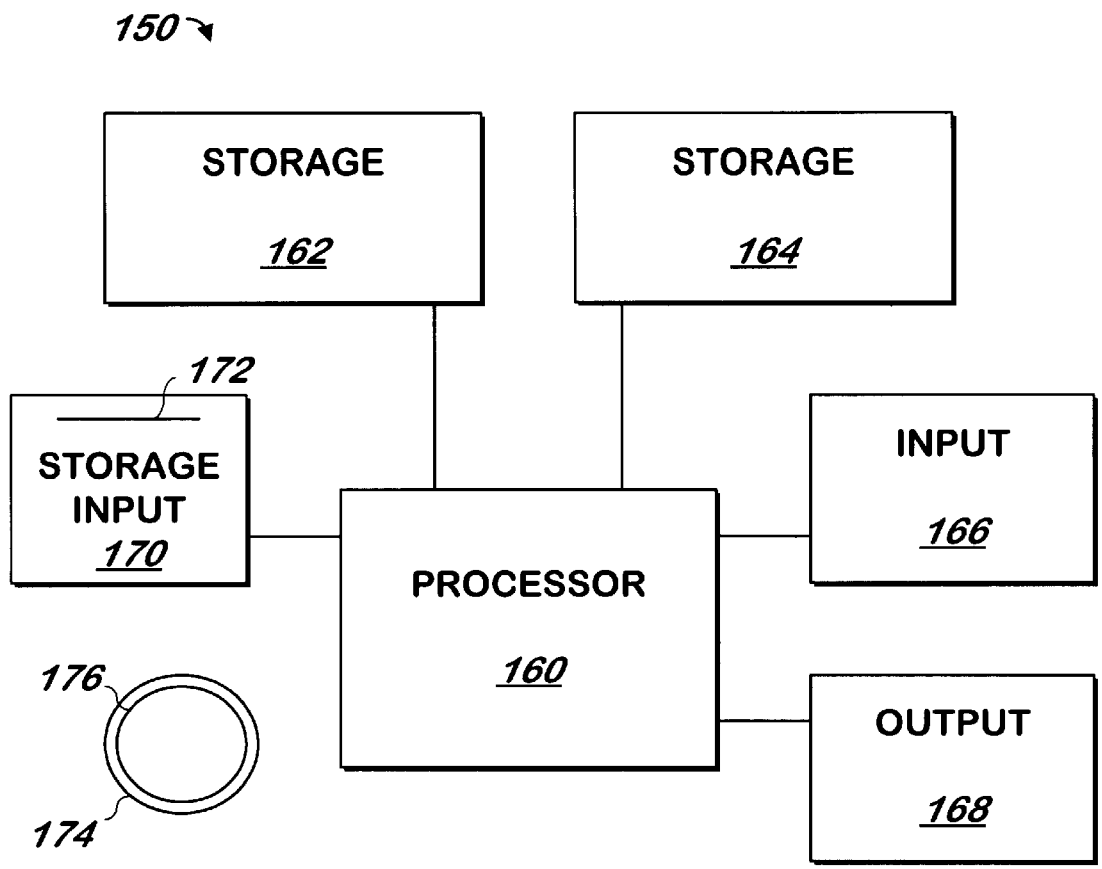
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Palo Alto, Calif., although other systems may be used.

Referring now to FIG. 2, an illustrative file that does not preserve all non-current information is shown according to one embodiment of the present invention. In one embodiment, the file is the control file as described above, although the present invention can be used to maintain non-current information from any file. The illustrative file 200 contains a header 209 and various sections 201, 202, 203, 204, 205. Each section 201, 202, 203, 204, 205 contains information describing a different aspect of the database as described above. Each section contains fixed length blocks, which store related information. For example, each block 210 in table space section 201 contains the name 216, a reference number 214 and attributes 218 of a table or group of one or more tables referred to as a tablespace.

Each block 220 in datafile section 202 contains a creation time 224, creation SCN 226, filename 228 and table space number 229 corresponding to one of the tablespace numbers in the tablespace section, for each file used to store the tablespaces in the tablespace section 201. The "SCN" is a transaction counter of the database that is incremented for each transaction performed by the database, and the "creation SCN" is the state of the SCN for the database at the time the file was created. Each block of datafile section 220 also contains a deleted flag 221 which identifies the space for the block in the datafile section 202 is available for reuse. For example, if the tablespace in section 201 is "dropped", meaning deleted, the block 220 corresponding to each datafile having the same tablespace number 229 as the table space number 214 of the dropped table space will be marked as deleted using deletion flag 221. If the new file is added to the datafile section, the space holding deleted blocks is used to store the new block describing the new file if a deleted block exists in datafile section 202. Otherwise the new block is added to the section 202 to store the information about the new file. Although only one block per section 201, 202 is illustrated in FIG. 2, the sections 201, 202 may have any number of blocks.

Online redo log section 203 contains one block 230 containing the creation time 234, creation SCN 236 and filename of the on-line (i.e. most current) redo log, describing how to redo a transaction. Archive logs section 204 contains blocks 240, 250, each containing the creation time 244, 254, creation SCN 246, 256 and filename 248, 258 of redo logs formerly in online redo log section 203. In addition, backup set log section 205 contains in blocks 260, 270 the creation time 264, 274 creation SCN 266, 276 and filename 268, 278 describing groups of files archived.

Although only one block per section 204, 205 is illustrated in FIG. 2, the sections 204, 205 may have any number of blocks.

Each block 210, 220, 230, 240, 250, 260, 270 contains a record identifier 212, 222, 232, 242, 252, 262, 272, which is unique to the section containing the block. The highest record ID for each section 201, 202, 203, 204, 205 is maintained in file header 209. When a block is added to a section 201, 202, 203, 204, 205 the highest record ID for that section is retrieved from header 209, incremented and the incremented record ID is stored back into header 209. The incremented record ID is used as the record ID of the new block.

In one embodiment, each of the sections 201, 202, 203, 204, 205 are one of two types of section. Sections 204 and 205 are "logged" sections. Logged sections always store at least one non-current block. In one embodiment, each of the logged sections 204, 205 contain blocks 240, 250, 260, 270 stored in a circular buffer. The circular buffer preserves some of the old blocks 240, 250, 260, 270, but overwrites one or more blocks new to the section over the oldest blocks in that section. Non-logged sections 201, 202, 203 are not stored in a circular buffer arrangement. These sections 201, 202, 203 either store only current information in each of the blocks 210, 220, 230, or may store current information and deleted blocks until the deleted blocks are overwritten as described above. Unlike the logged sections 204, 205 there is no guarantee that the non-logged sections 201, 202, 203 contain any non-current information.

As described in more detail below, in one embodiment, the present invention maintains current and non-current information from the file in a database, with one table in the database per section 201, 202, 203, 204, 205 of the file 200. Each block 210, 220, 230, 240, 250, 260, 270 in the file 200 corresponds to one row of a database table for that section 201, 202, 203, 204, 205. The information stored in the database may be some or all of the information that was stored in the file 200. Additional information not in the file may also be stored in the database tables as described below.

Figure 3:
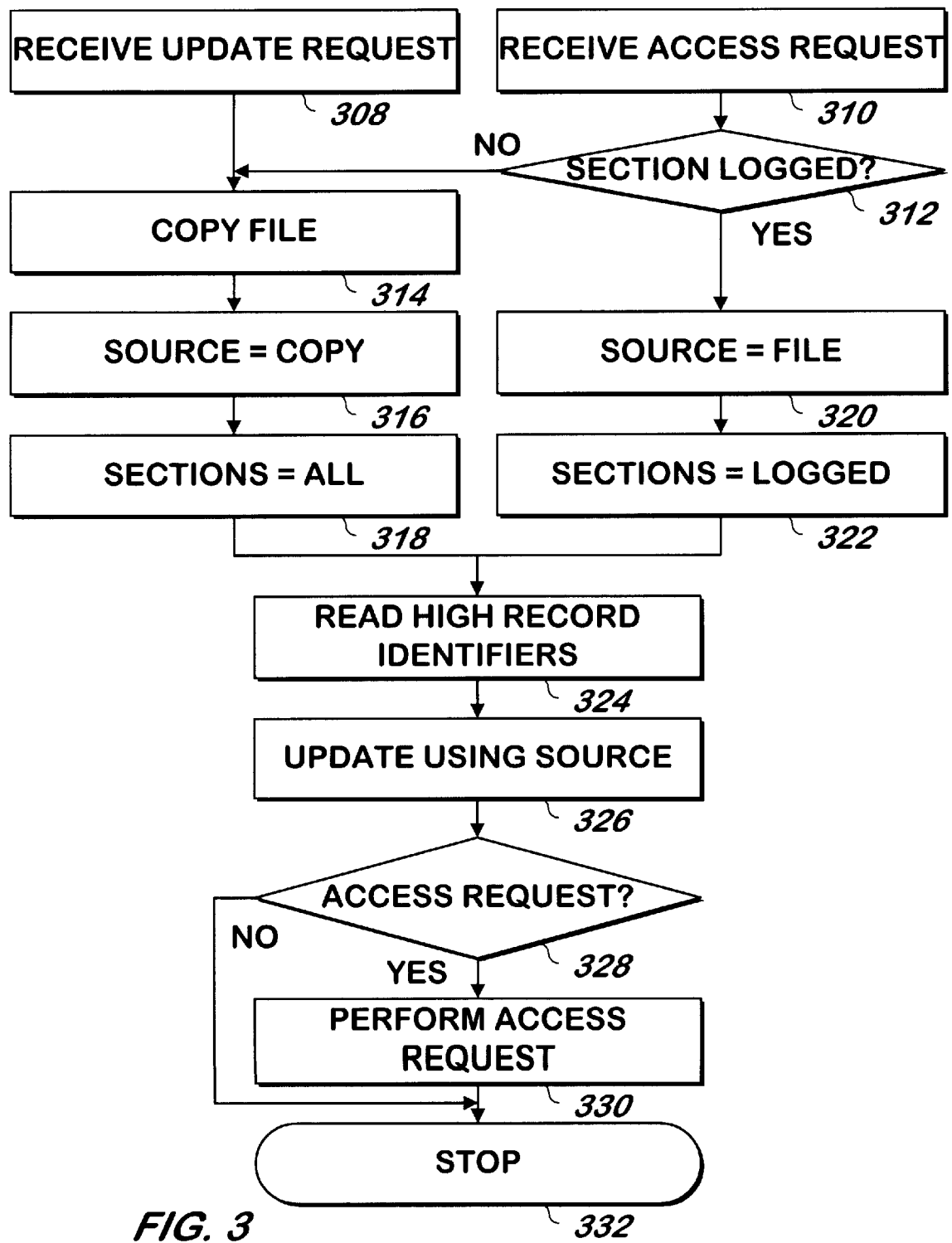
FIG. 3 is a flowchart illustrating a method of maintaining in a database current and non-current information from a file according to one embodiment of the present invention.

Referring now to FIG. 3, a method of updating a database containing current and non-current information from a file is shown according to one embodiment of the present invention. The database may be a conventional relational database, a table, an array or a flat file. In an alternate embodiment of the present invention not illustrated, only non-current information is maintained in the database.

In one embodiment, the method of FIG. 3 may be initiated in response to either of 2 actions. The method of FIG. 3 may be initiated automatically upon receipt of a request to access the information in the database 310. Alternatively, the method of FIG. 3 may be initiated upon receipt of a manual request, for example from a user, to update the database from the file 308.

If an access request is received 310, the request may contain the name or other identifier of the section and the name or other identifiers of the database containing the current and non-current information and the file containing the current information. In one embodiment, a name or other identifier is received and the names of the database and file are implied from this name. If the section to be accessed is a logged section 312, only the logged sections in the database will be updated. Step 312 may be performed by comparing the name of the section received in step 310 with a list of logged sections. The source of the information from which to update the database is designated as the file 320. The methods described in copending application, attorney docket number 1038, Ser. No. 08/961,741 (pending) may be used to avoid inconsistent data from being introduced into the database containing the current and non-current information. In one embodiment, if the method of FIG. 3 is initiated in response to an access request and the section to be accessed is logged, the sections to be updated are designated as only the logged sections 322.

If the section designated in the access request received in step 310 is not a logged section, or an update request is received as described above, the tables in the database corresponding to all of the sections in the file will be updated as described below. In one embodiment, if the entire file is to be updated, the file is copied 314 to prevent inconsistent data from being introduced into the file by other processes which may access the file during the update. The source file used for the update process is designated as the copied file 316. In addition, the sections to be updated are designated as all sections in the copied file 318.

The header block of the source file is read to identify the highest record identifier of each section and the number of blocks of each section 324. The database is updated using the source file as described in more detail below 326. If the method was initiated using an access request as described above in step 310, the access request is performed 328, 330 by reading or writing the database before the method terminates 332. Otherwise, the method terminates 332.

In one embodiment, update step 326 is performed differently depending on the sections to be updated. If the tables to be updated correspond to all the sections of the file as described above in step 318, update step 326 is performed in one manner described below. If the sections to be updated are just the logged sections as described in step 322, update step 326 is performed in a different manner described below.

Figure 4:
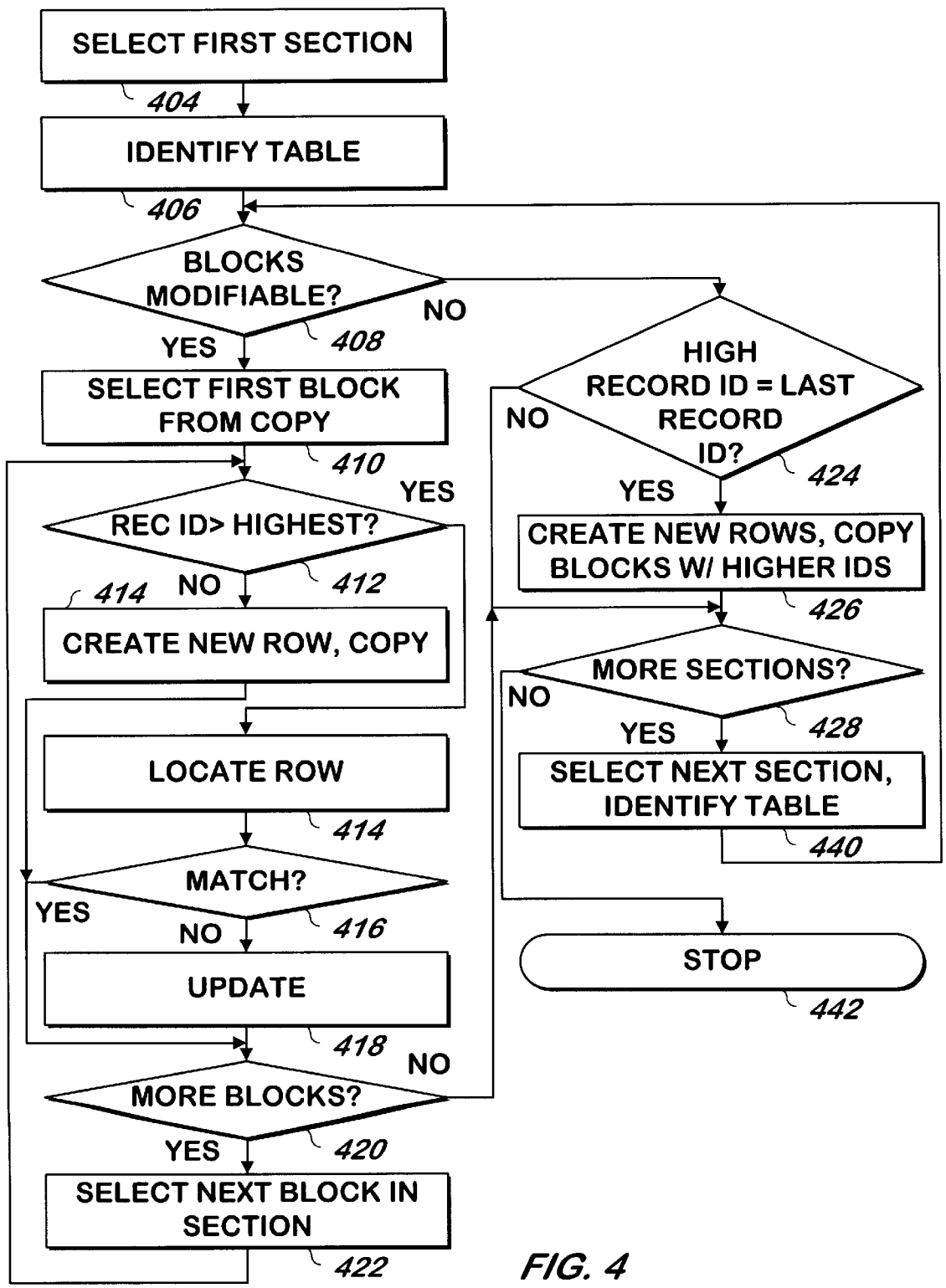
FIG. 4 is a flowchart illustrating a method of updating a database that stores current and non-current information from a file according to one embodiment of the present invention.

Referring now to FIG. 4, a method of updating a database that stores current and non-current information from a file is shown according to one embodiment of the present invention. One section from among those to be updated as designated in step 322 or step 318 of FIG. 3 is selected 404. The table in the database corresponding to the section selected is identified 406. Step 406 may be performed using a look up table that matches section names from the file with the corresponding table names in the table in one embodiment. In another embodiment, the table name is the same as the section name, and step 406 uses the name of the section of the file. In another embodiment, step 404 selects a table in the database and step 406 identifies a section in the file corresponding to the database table selected.

As described in more detail below, if the blocks in the selected section are able to be modified 408, each of the blocks in the selected section of the file are verified to determine if they have been modified since the database was last updated. If any blocks have been modified, the corresponding rows in the database are updated from the updated blocks in the file. Otherwise, new rows containing some or all of the information in each of the blocks not already stored in the database are inserted into the database.

If the blocks in the selected section are able to be modified 408, the first block is selected from that section of the source file 410 designated in step 316 or 320 of FIG. 3. If the record identifier of the selected block is higher than the highest record identifier in the table 412, a new row in the database table is created for the block and some or all of the information from the block is copied into the new row 414. Otherwise, the row corresponding to the block selected in step 410 in the table identified of step 408 is located 414. In one embodiment, step 414 is accomplished by selecting the row in the table of the database selected in step 406 having a record ID which matches the record identifier in the block selected in step 412. The other information in the block which is also stored in the selected row is compared to that information in the row. If the information in the block matches 416 the information in the selected row, the method continues at step 420. Otherwise, the information in the block that differs from the selected row is copied into the row selected in step 412. If there are additional blocks in the section selected in step 406, the next block in that section is selected 422 and the method continues at step 412. If there are no more blocks in the section of the source file, the method continues at step 428.

If the blocks in the section cannot be modified 408, the update procedure continues at step 424. The high record identifier in the header of the source file that corresponds to the section selected in step 404 is compared 424 with the highest value record identifier in the table identified in step 406, which in one embodiment is located in the last row of the table. If these two identifiers are equal, no changes have been made to the section and the method continues at step 428. Otherwise, a part or all of the blocks in the source file having record identifiers higher than the highest record identifier in the table identified in step 406 are copied into one or more newly created rows of the table 426. If there are more sections from those identified in step 322 or 318 of FIG. 3, the next section from such identified sections is selected and the table in the database corresponding to the selected section is identified 440 as described above and the method continues at step 408. Otherwise, the method terminates 442.

Figure 5:
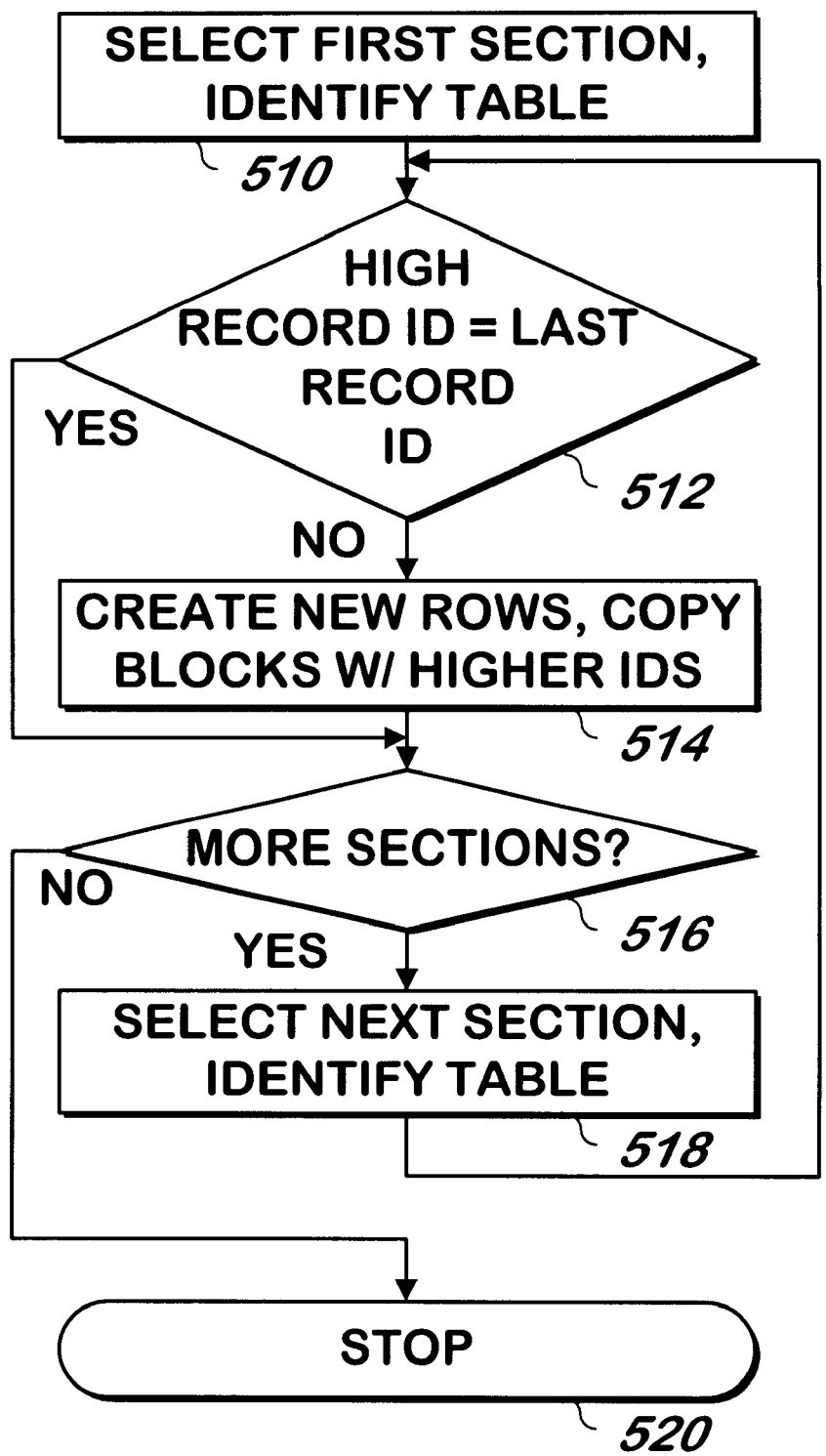
FIG. 5 is a flowchart illustrating a method of updating a database that stores current and non-current information from a file according to an alternate embodiment of the present invention.

Referring again to FIG. 3, if the sections selected to be updated in step 322 are logged, in one embodiment, none of the blocks in the logged sections are able to be modified. As a result, steps 408 through 422 in FIG. 4 need not be used. Referring now to FIG. 5, a method of updating a database that stores non-current information from blocks of a file in which none of the blocks may be modified is shown. The first section to be updated from those designated in step 322 is selected and the corresponding table is identified as described above 510. The highest record identifier read from the header of the file is compared with the highest record identifier in the table 512. In one embodiment, the highest record identifier is stored in the last row of the table. If such identifiers are equal, the method continues at step 516. Otherwise, one row is created in the database table identified in step 510 for each such block, and some or all of the information from such blocks is copied into these newly created rows 514. If there are more sections to be updated 516, the next section is selected in the table corresponding to the section is identified 518 as described above. Otherwise, the method terminates 520.

Figure 6:
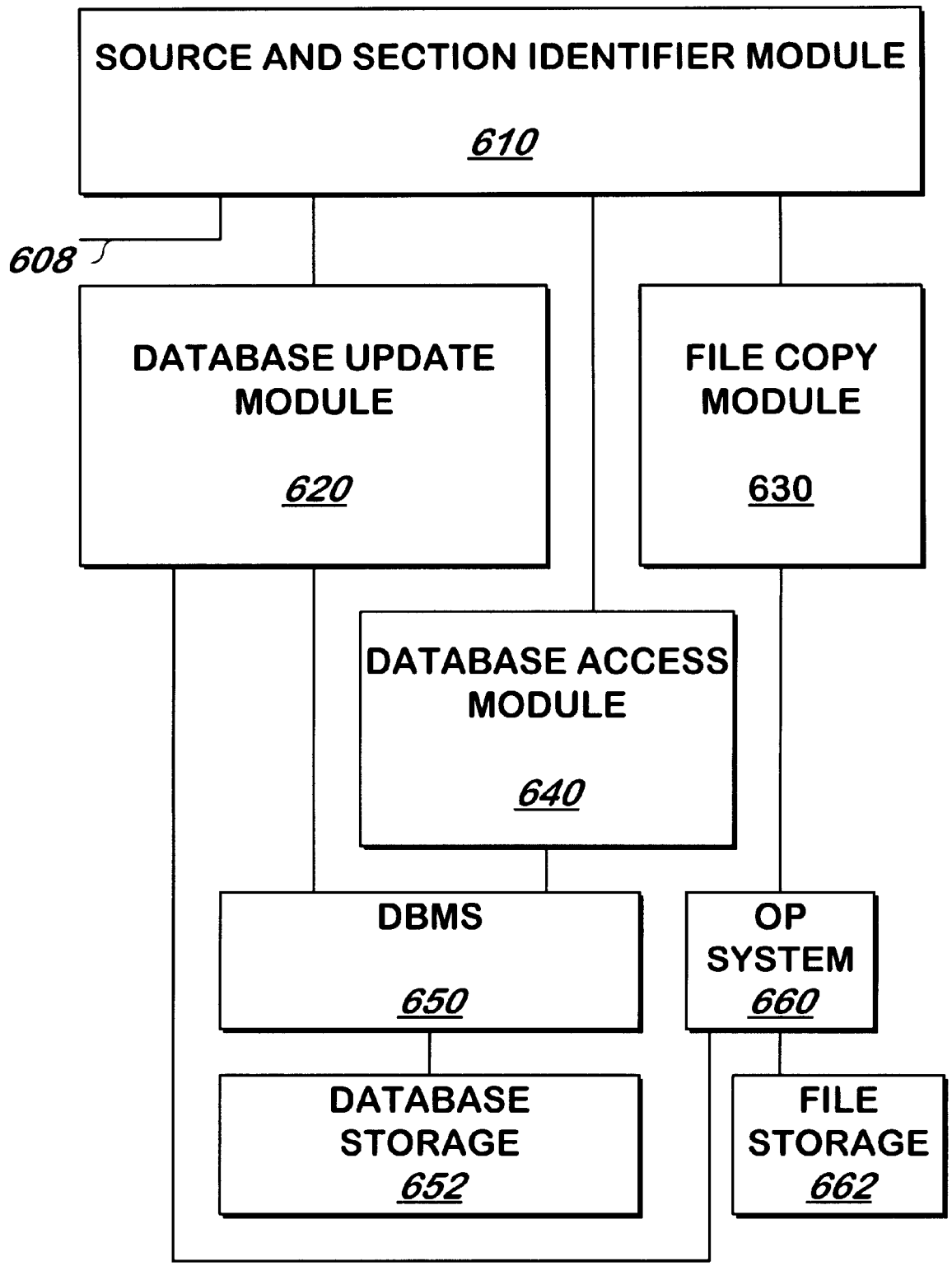
FIG. 6 is a block schematic diagram of an apparatus that maintains in a database current and non-current information from a file according to one embodiment of the present invention.

Referring now to FIG. 6, a system that maintains in a database current and non-current information from a file is shown according to one embodiment of the present invention. Source and section identifier module 610 receives at input/output 608 an access or update request as described above. The access request may contain the name of the database that stores the non-current information, the name of the file and the name of the section applicable to the request. If the request is an update request, or an access request for a section that is logged, source and section identifier module signals file copy module 630 with the name of the file and a name into which the file is to be copied. File copy module 630 copies the file from file storage 662 into a different file in file storage 662 having a name received from source and section identifier module. In one embodiment, file copy module 630 copies the file by calling operating system 660, which copies the file from one location in file storage 662 to a different location in file storage 662. In one embodiment, the header of the file to be copied is flagged by during the copy to inhibit other processes from writing to the file during the copy process. In another embodiment, other processes are inhibited by source and section identifier module 610 via input/output 608 during the copy process.

In one embodiment, every file uses the same section names, and source and section identifier module stores a table relating the names of each section with whether the section is logged to determine whether the file is to be copied. In one embodiment, if the file is not copied, the invention described in copending application, attorney docket number 1038 Ser. No. 08/961,741 (pending) is used to avoid reading inconsistent data from the file.

Source and section identifier module 610 next signals database update module 620, described in more detail below, to update the database as described in FIGS. 4, 5 and 6 above using conventional DBMS 650, such as the Oracle8 product commercially available from Oracle Corporation of Redwood Shores, Calif., coupled to the storage 652 for the database. Source and section identifier module 610 passes to the database update module 620 the name of the file, name of the database and name of the sections to be updated, determined as described above.

After the database is updated, source and section identifier module 610 next passes any access request received at input 608 to database access module 640. Database access module 640 accesses the database as requested and if the access returns information to the requestor, database access module 640 passes such information to source and section identifier module 610. Source and section identifier module transmits such response via input/output 608.

Figure 7:
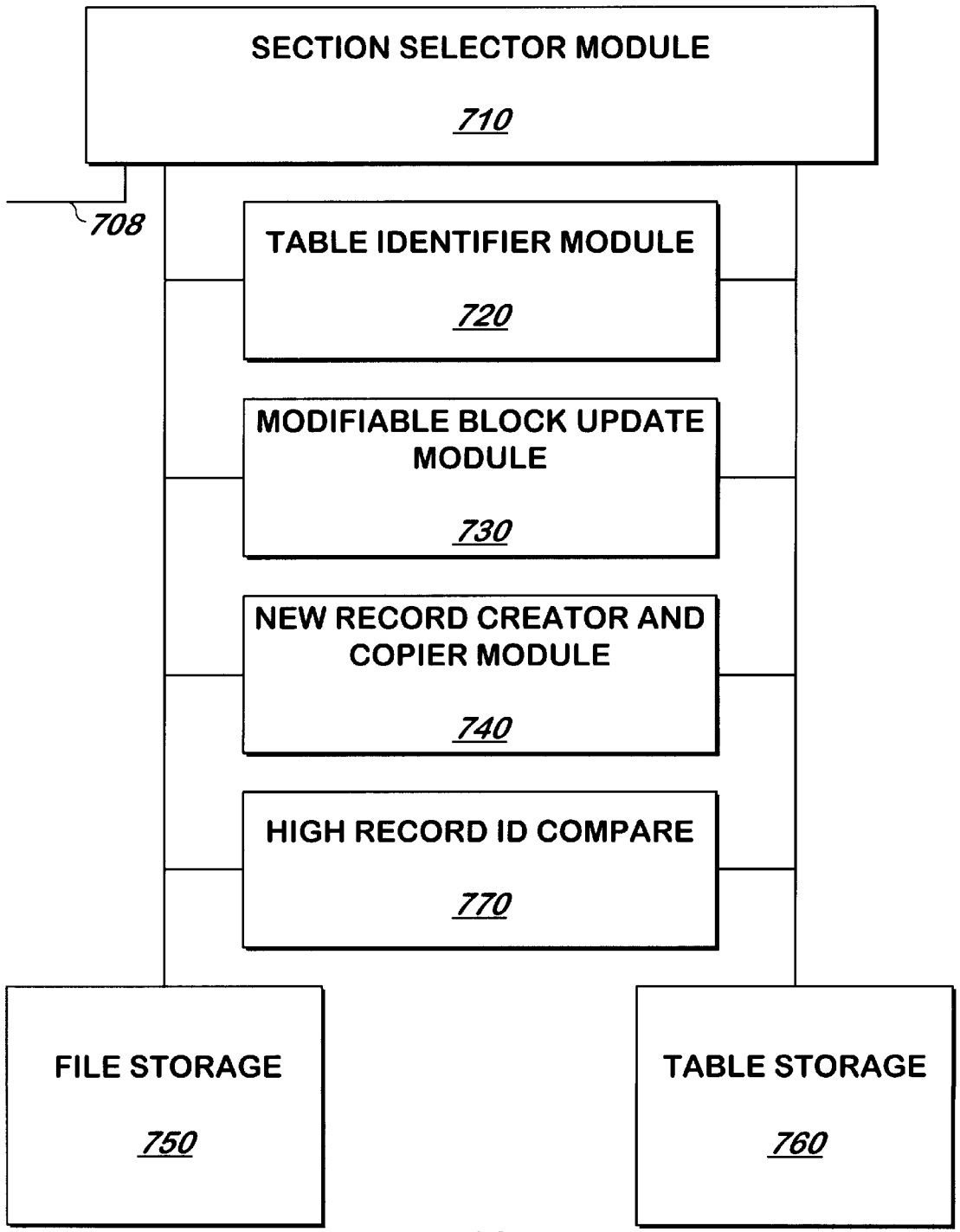
FIG. 7 is a block schematic diagram of a database update module of FIG. 6 according to one embodiment of the present invention.

Referring now to FIG. 7, database update module 620 is shown according to one embodiment of the present invention. Section selector module 710 receives at input 708 the names of the sections to be updated, and indicators such as the name or names of the database and the file.

Section selector module 710 opens in table storage 760 the table identified, either directly or via a DBMS (shown in FIG. 6) as described above and opens in file storage 750 the file identified, either directly or via an operating system call via the operating system shown in FIG. 6 as described above. Section selector module 710 signals high record ID compare 770 to read the header of the file in file storage 750. High record ID compare stores the high record IDs for each of the sections in the file for use as described below.

Section selector module 710 selects one of the sections to be updated as received at input 708. Section selector module 710 requests from table identifier module 720 the name of the table in the database corresponding to the section, which may be stored in a lookup table in table identifier module 720 in one embodiment. In another embodiment, the name of the table is the same as the name of the section and table identifier 720 may be omitted. Table identifier module 720 passes the name of the table it identifies to section selector module 710.

In one embodiment, section selector module 710 signals high record ID compare 770 with the name of the selected section and the name of the corresponding table. High record ID compare 770 compares the highest record identifier for that section read from the header with the highest record identifier in the table identified. If the two record identifiers are equal, high record identifier compare 770 signals section selector module 710 which selects the next section from those received at input 708 from source and section identifier module 610 of FIG. 6.

Section selector module 710 consults a lookup table to determine if the section selected contains blocks that are able to be modified as described above. If so, section selector module 710 signals modifiable block update module 730. Modifiable block update module 730 receives the names of the file, selected section and table from section selector module 710 and scans blocks in the file opened in file storage 750 of the selected section and compares them with the corresponding records in table storage 760 of the identified table. If necessary, rows in table storage 760 corresponding to any blocks in the table in table storage 750 are updated as described above. Section selector module 710 signals new record creator and copier module 740 with the name of the file, table and selected section. New record creator and copier module 740 scans the blocks in the file in file storage 750 and creates new rows in the table in table storage 760 corresponding to any blocks having a record identifier greater than the maximum record identifier obtained from high record ID compare 770 or the header of the file stored in file storage 750.

Section selector module 710 selects the next section from those received at input 708 and repeats the process described above, until all sections indicated an input 708 have been updated.

In one embodiment, all blocks in some or all of the sections of the file contain space for a deletion SCN and deletion time describing the SCN and time the block ended being current. The space is written with the SCN of the database described by the file when a block is no longer current, and this information is copied into the database as described above, with such sections being designated as having blocks able to be modified as described above.

In another embodiment, the present invention can identify a deletion time and/or SCN and copy such time or SCN to rows in the database corresponding to deleted blocks in the file. For example, if a section contains only one block, always current, such as online redo log section 203 of FIG. 2, when a new block is detected in the section, the row corresponding to the formerly current block can be assigned a deletion SCN equal to one less than the creation SCN of the new block. The row corresponding to the formerly current block can be assigned a deletion time equal to one unit of time less than the creation time of the new block. In one embodiment, a "time" contains an identifier of a date and time. In one embodiment, this function is performed as part of the copy steps 414 or 426 of FIG. 4, or by new record creator and copier module 740 of FIG. 7.

To perform the same function for sections of the file containing more than one block, a different procedure may be used. In one embodiment, each row in the database contains a position identifier, identifying the position of the block in the file from which the information in that row was copied. If a new block is written over an old block, when the new block is copied into the file, the row having the same position identifier and no value stored in the deletion SCN is located. A value of one less than the new block's creation SCN is assigned to the deletion SCN of the row located. A value of one unit of time less than the creation time for the new block may be assigned to the deletion time attribute of the row located. In one embodiment, this function is performed as part of the copy steps 414 or 426 of FIG. 4, or by new record creator and copier module 740 of FIG. 7.

In the event that a section allows blocks to be marked for deletion, the section may be scanned for such blocks. The record identifier of the block marked for deletion is used to locate the row corresponding to this block, and the current SCN value may be read from the file header and the current time read from a system clock and written into the row located as the deletion SCN and time. In one embodiment, this function is performed as part of the copy steps 414 or 426 of FIG. 4 (with or without comparing step 424), or by new record creator and copier module 740 of FIG. 7 (with or without using high record ID compare 770).

Related records may be similarly identified. For example, if the procedure above is used to identify the ending SCN of a datafile, the SCN and time the tablespace stored by the datafile was dropped may be inferred by the same step or apparatus that identified the ending SCN and time. This SCN and time is the same as, or one less than, the ending SCN and time of the datafile, and the row corresponding to the tablespace may be updated by the same step or apparatus as described above.

To use the database to locate rows as of a certain point in time or as of a certain SCN, the rows in the tablespace section or datafiles section having a creation SCN or time before the desired point in time, and no deletion SCN or time or a deletion SCN or time after the desired point in time, may be retrieved. Rows in tables that have a creation SCN or time but no deletion SCN or time may be retrieved by locating the row or rows having the creation SCN or time that is the latest SCN or time in the table that is not later than the desired SCN or time.

The retrieval may be performed from the database rows using the record ID of a backup set log row by locating the creation and deletion SCN of the row corresponding to that record identifier, and identifying rows that either have a creation SCN that is on or before the located creation SCN with a deletion SCN not before the located creation SCN. Alternatively, in the case of the archived record log section, rows are identified starting with the row having the latest creation SCN not later than the located creation SCN and ending with the row having the latest creation SCN not later than the located deletion SCN of the backup set.

If the database is not available, the file and portions of the above procedures may be used to identify a limited number of periods of validity of non-current data that remains in the file. For example, if blocks in the datafiles section of the file store deletion SCNs, to identify when a tablespace was dropped from a database, the deletion SCN of any blocks of datafiles corresponding to the tablespace, and marked for deletion but not yet overwritten may be used to determine the SCN at which the tablespace was dropped. The tablespace may be dropped one SCN prior to the deletion SCN of the datafile that contained some or all of the tablespace in one embodiment.

What is claimed is:

1. An apparatus for updating a database comprising information from a file comprising at least one section, each section comprising at least one block of information, each block having a first identifier, the file additionally comprising a set of a plurality of second identifiers, each second identifier corresponding to at least one of the first identifiers, the database comprising a set of a plurality of third identifiers, each third identifier corresponding to at least one of the second identifiers from a version of the file, the apparatus comprising:

a high record ID compare having a first input operatively coupled to receive at least one of the second identifiers and a second input operatively coupled to receive at least one of the third identifiers, the modifiable block update module for comparing the at least one second identifier received at the modifiable block update first input with the at least one third identifier received at the modifiable block update second input and for signaling at an output responsive to at least one of the at least one second identifiers greater than the at least one third identifiers; and a new record creator and copier module having an input coupled to the high record ID compare output for generating and providing at an output at least one row in the database responsive to the signal received at the new record creator input.

2. The apparatus of claim 1, wherein the new record creator additionally has a block input operatively coupled to receive at least one of the blocks of information, and at least one of the at least one row generated by the new record creator corresponds to at least one of the blocks of information received at the new record creator block input.

3. The apparatus of claim 1 additionally comprising a modifiable block update module having a section input operatively coupled for receiving at least a first portion of one of the at least one block and a database input/output operatively coupled for receiving at least a second portion of a row of the database, the modifiable block update module for comparing at least some of the second portion received at the database input/output and at least some of the second portion of the at least one block, and, responsive to the at least the some of the first portion different from the some of the second portion, providing at the database input/output at least one third portion of a row for substitution in place of at least a part of the at least one row having the second portion received at the database input/output.

4. The apparatus of claim 3 wherein the modifiable block update module provides the third portion responsive to the first portion.

5. The apparatus of claim 3:

additionally comprising a section selector module having an input operatively coupled to receive a request, the request corresponding to at least one of the at least one section, the section selector module for signaling at an output responsive to the section corresponding to the request being able to be modified; and wherein the modifiable block update module additionally has a signal input coupled to the section selector output, and the modifiable block update module compares responsive to the signal input;

responsive to a request comprising at least one selected from an access request and an update request.

6. The apparatus of claim 5, wherein the request comprises at least one selected from an access request and an update request.

7. The apparatus of claim 6, wherein the request comprises an access request and the access request references a referenced section, the apparatus additionally comprising a file copy module for copying at least one of the blocks from an original file into the file.

8. The apparatus of claim 5 additionally comprising a database access module having an input operatively coupled for receiving the request and an input/output coupled to the database, the database access module for retrieving and providing at an output a portion of the database responsive to the request received at the database access module input.

9. The apparatus of claim 3 additionally comprising a database access module having an input operatively coupled for receiving a request to access the database and an input/output coupled to the database, the database access module for retrieving and providing at an output a portion of the database responsive to the request received at the database access module input.

10. The apparatus of claim 2 additionally comprising a database access module having an input operatively coupled for receiving a request to access the database and an input/output coupled to the database, the database access module for retrieving and providing at an output a portion of the database responsive to the request received at the database access module input.

11. An apparatus for updating a database comprising a plurality of rows of information from a file comprising a plurality of sections, each section comprising at least one block of information, each block having a first identifier, the file additionally comprising a set of a plurality of second identifiers, each second identifier corresponding to at least one of the first identifiers, the database comprising a set of a plurality of third identifiers, each third identifier corresponding to at least one of the second identifiers from a version of the file, the apparatus comprising modifiable block update module having a section input operatively coupled for receiving at least a first portion of one of the at least one block and a database input/output operatively coupled for receiving at least a second portion of a row of the database, the modifiable block update module for comparing at least some of the second portion received at the database input/output and at least some of the second portion of the at least one block, and, responsive to the at least the some of the first portion different from the some of the second portion, providing at the database input/output at least one third portion of a row for substitution in place of at least a part of the at least one row having the second portion received at the database input/output.

12. The apparatus of claim 11 wherein the modifiable block update module provides the third portion responsive to the first portion.

13. The apparatus of claim 11:

additionally comprising a section selector module having an input operatively coupled to receive a request, the request corresponding to at least one of the at least one section, the section selector module for signaling at an output responsive to the section corresponding to the request being able to be modified; and wherein the modifiable block update module additionally has a signal input coupled to the section selector output, and the modifiable block update module compares responsive to the signal input;

responsive to a request comprising at least one selected from an access request and an update request.

14. The apparatus of claim 13, wherein the request comprises at least one selected from an access request and an update request.

15. The apparatus of claim 14, wherein the request comprises an access request and the access request references a referenced section, the apparatus additionally comprising a file copy module for copying at least one of the blocks from an original file into the file.

16. The apparatus of claim 11 additionally comprising a database access module having an input operatively coupled for receiving a request to access the database and an input/output coupled to the database, the database access module for retrieving and providing at an output a portion of the database responsive to the request received at the database access module input.

17. The apparatus of claim 13 additionally comprising a database access module having an input operatively coupled for receiving the request and an input/output coupled to the database, the database access module for retrieving and providing at an output a portion of the database responsive to the request received at the database access module input.

* * * * *